United States Patent
Kosuge et al.

(10) Patent No.: US 7,578,523 B2
(45) Date of Patent: Aug. 25, 2009

(54) FOUR WHEELED UTILITY VEHICLE

(75) Inventors: Hideyoshi Kosuge, Kobe (JP); Naoki Hashimoto, Kakogawa (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 0 days.

(21) Appl. No.: 11/896,895

(22) Filed: Sep. 6, 2007

(65) Prior Publication Data

US 2008/0053738 A1 Mar. 6, 2008

(30) Foreign Application Priority Data

Sep. 6, 2006 (JP) ............................. 2006-241295

(51) Int. Cl.
*B60R 21/13* (2006.01)
(52) U.S. Cl. ........................ 280/756; 296/29; 296/203.3
(58) Field of Classification Search ................. 280/756; 296/205, 21, 203.3, 29, 104
See application file for complete search history.

(56) References Cited

U.S. PATENT DOCUMENTS

| | | | | |
|---|---|---|---|---|
| 4,600,236 A | * | 7/1986 | Weiss et al. | 296/190.03 |
| 4,669,565 A | * | 6/1987 | Miki et al. | 180/89.12 |
| 4,924,959 A | * | 5/1990 | Handa et al. | 180/297 |
| D342,701 S | | 12/1993 | Murata et al. | |
| 5,788,452 A | * | 8/1998 | Brouwer et al. | 414/631 |
| 5,931,524 A | * | 8/1999 | Jones, Jr. | 296/177 |
| D439,548 S | | 3/2001 | Kouchi et al. | |
| 6,419,304 B1 | * | 7/2002 | Richardson et al. | 296/190.03 |
| 6,517,111 B2 | * | 2/2003 | Mizuta | 280/756 |
| 6,749,039 B1 | * | 6/2004 | Uphaus | 180/357 |
| 7,222,882 B2 | * | 5/2007 | Boucher | 280/756 |
| 7,249,798 B2 | * | 7/2007 | Saito et al. | 296/205 |
| 7,261,321 B2 | * | 8/2007 | Della Valle | 280/756 |
| 2005/0156422 A1 | * | 7/2005 | Della Valle | 280/756 |

\* cited by examiner

*Primary Examiner*—Toan C To
(74) *Attorney, Agent, or Firm*—Wenderoth, Lind & Ponack, L.L.P.

(57) ABSTRACT

A four wheeled utility vehicle includes a pair of right and left rear wheels, a cabin arranged between the front wheels and the rear wheels, the cabin being defined with a cabin frame and accommodating an operational unit for the vehicle and seats for a passenger of the vehicle, a front fender for covering the front wheel and a front portion of the cabin frame, a protective frame disposed from a front portion of the cabin to a rear portion of the cabin through an upper portion of the cabin, and a front fixing member fixed rigidly to the front portion of the cabin frame so as to extend upward and project from the front fender through a through hole formed in the front fender, wherein a fore lower end of the protective frame is detachably and attachably fixed to the front fixing member at an upper end portion of the front fixing member.

12 Claims, 5 Drawing Sheets

FOUR WHEELED UTILITY VEHICLE

BACKGROUND OF THE INVENTION

1. Field of the Invention

The present invention relates to a four wheeled utility vehicle, in particular, relates to a fixing structure of a protection frame for a cabin of the vehicle.

2. Description of the Related Art

A four wheeled utility vehicle of this type is provided with a protective frame from a front portion of a cabin to a rear portion of the cabin through an upper portion of the cabin in order to protect a rider inside of the cabin.

As to a structure for fixing a protective frame of a cabin in a four wheeled utility vehicle, U.S. Pat. No. 6,517,111 (corresponding to U.S.D. No. 439,548) discloses a fixing structure, in which a front lower end of a protective frame is fixed sideways to a frame member of the vehicle through a cut-out formed in a side surface of a bonnet for covering a front portion of a chassis. Otherwise, U.S.D. No. 342,701 discloses a structure, in which a protective frame of a cabin extends to a bumper disposed at a fore end of a vehicle, to be fixed to the bumper. Alternatively, there have been conventionally known various other structures, for example, a structure in which a fore lower end of a protective frame of a cabin is allowed to project downward from a through hole formed at a bonnet or a front fender, to be fixed to a frame member of a vehicle inside of the bonnet or the front fender, a structure in which a cabin frame defining the cabin and the protective frame covering the cabin from above are integrally formed in a state exposed sideways from the cabin; and the like.

The fixing structure disclosed in U.S. Pat. No. 6,517,111 is restricted in the fixing position of the protective frame, thereby making it difficult to achieve a light weight and compactness.

The fixing structure disclosed in U.S.D. No. 342,701 enlarges the protective frame which is liable to come within sight of a driver since the protective frame extends to the bumper at the fore end of the vehicle.

Otherwise, the fixing structure, in which the fore lower end of the protective frame is fixed to the frame member or the like inside of the hood or the front fender, takes labor in attaching or detaching the protective frame. Particularly, in the case where an engine or electrical components are contained inside of the hood, a seal needs be interposed between the through hole formed at the hood and the protective frame, so as to prevent rainwater from intruding inward.

Additionally, the structure in which the protective frame and the cabin frame are exposed sideways from the cabin and are integrated with each other makes it difficult to maintain a good appearance, and needs a large mounting space in transporting the four wheeled utility vehicle on a truck or the like.

SUMMARY OF THE INVENTION

The present invention addresses the above-described condition, and an object of the present invention is to provide a four wheeled utility vehicle to or from which a protective frame for a cabin can be readily attached or detached. Another object is to maintain a high fixing rigidity of the protective frame while minimizing the increase in weight caused by the protective frame. Another object is to maintain a good appearance of the vehicle.

A four wheeled utility vehicle according to the present invention comprises a pair of right and left front wheels, a pair of right and left rear wheels, a cabin arranged between the front wheels and the rear wheels, the cabin being defined with a cabin frame and accommodating an operational unit for the vehicle and seats for passengers, a front fender for covering the front wheel and a front portion of the cabin frame, a protective frame disposed from a front portion of the cabin to a rear portion of the cabin through an upper portion of the cabin, and a front fixing member fixed rigidly to the front portion of the cabin frame so as to extend upward and project from the front fender through a through hole formed in the front fender, wherein a fore lower end of the protective frame is detachably and attachably fixed to the front fixing member at an upper end portion of the front fixing member.

With this configuration, the fore lower end of the protective frame is fixed to the front fixing portion of the cabin frame, thereby maintaining a high fixing rigidity of the protective frame. In addition, the front fixing portion projects upward from of the front fender, and therefore, the protective frame can be readily attached to or detached from the vehicle. Moreover, since the protective frame can be detached from the vehicle, it becomes possible to reduce a carrying space in a freight truck or a ship in the case of the transportation of the four wheeled utility vehicle by detaching the protective frame, and further, to facilitate a loading and unloading work on or off the freight truck or the ship.

According to the present invention, it is preferable that the front fixing member may have a fixing surface oriented outward in a vehicle width direction, and further, the fore lower end of the protective frame may be fixed to the fixing surface from the outside in the vehicle width direction.

With this configuration, it is possible to enhance the strength of the protective frame against a load in the vehicle width direction, and further, to facilitate the protective frame fixing work from the outside in the vehicle width direction.

According to the present invention, it is desirable that the fore lower end of the protective frame may be tightened to the fixing surface of the front fixing member via bolts to be inserted from the outside in the vehicle width direction.

With this configuration, it is possible to further facilitate the protective frame fixing work.

According to the present invention, a fixing structure for the protective frame at the rear lower end thereof may adopt a similar fixing structure for the protective frame at the fore lower end thereof in the four wheeled utility vehicle. That is to say, the cabin frame may be provided with a rear fixing member fixed rigidly to the rear portion of the cabin frame so as to extend upward and project from an upper end of a side cover for covering a side of a rear portion of the cabin frame, wherein a rear lower end of the protective frame may be fixed to the rear fixing member at an upper end portion of the rear fixing member. In addition, the rear fixing member may have a fixing surface oriented outward in a vehicle width direction, and further, the rear lower end of the protective frame may be fixed to the fixing surface from the outside in the vehicle width direction. Moreover, the rear lower end of the protective frame may be tightened to the fixing surface of the rear fixing member via bolts to be inserted from the outside in the vehicle width direction.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE PREFERRED EMBODIMENT

FIGS. 1 to 5 show an embodiment of a four wheeled utility vehicle according to the present invention. A preferred embodiment according to the present invention will be explained in reference to FIGS. 1 to 5. For the sake of the explanation below, a forward traveling direction of a vehicle is referred to as forward of the vehicle, and further, a lateral direction viewed from a passenger is referred to as a lateral direction of the vehicle.

Figure 1:
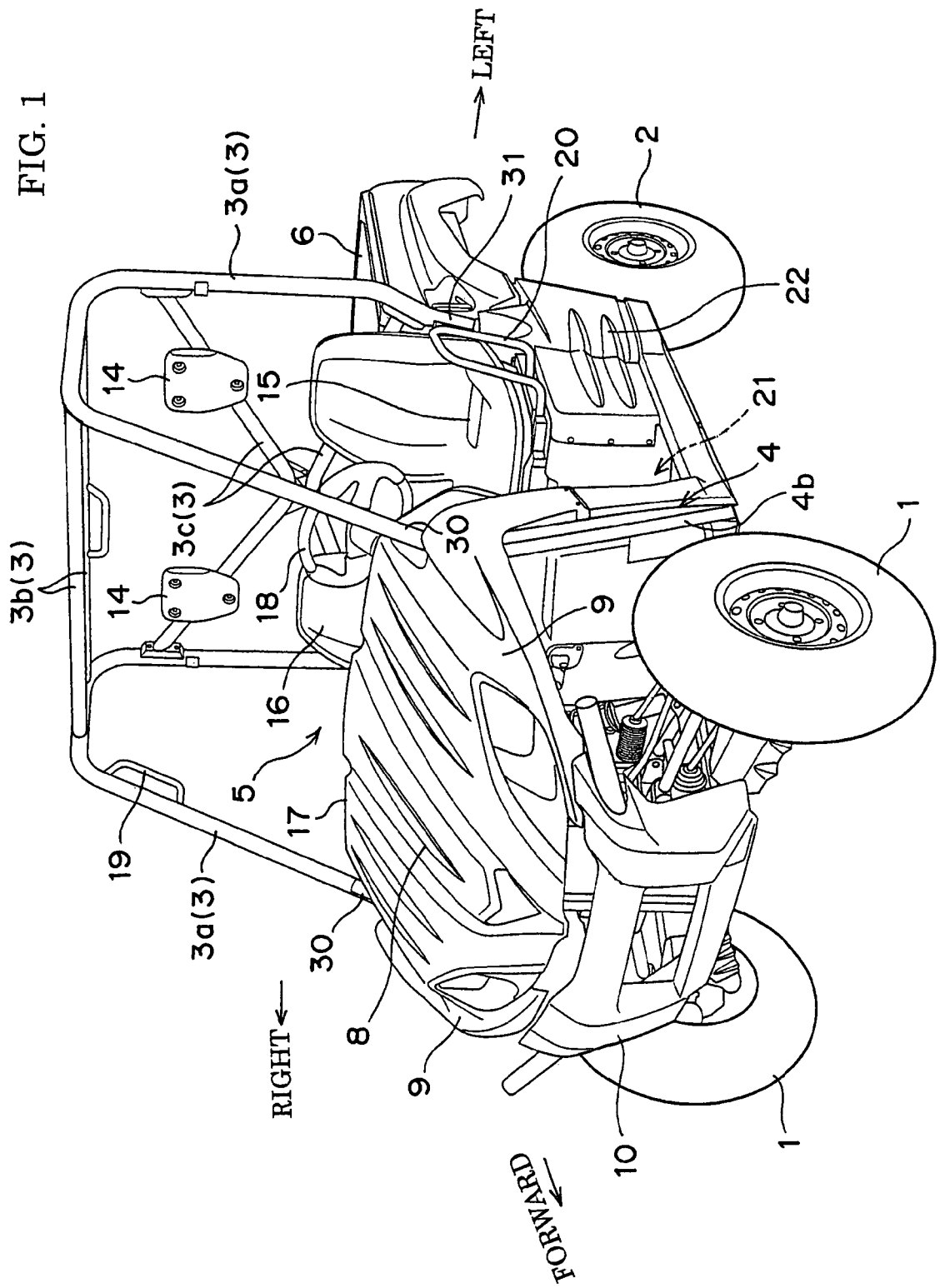
FIG. 1 is a perspective view showing a preferred embodiment of a four wheeled utility vehicle according to the present invention.

FIG. 1 is a perspective view showing the four wheeled utility vehicle. The four wheeled utility vehicle includes a pair of right and left front wheels 1 at a front portion of the vehicle, a pair of right and left rear wheels 2 at a rear portion of the vehicle, a cabin 5 arranged between the front wheels 1 and the rear wheels 2 and defined with a metallic cabin frame 4, a load carrying platform (cargo bed) 6 behind the cabin 5, a bonnet 8 made of resin or metal in front of the cabin 5, a pair of right and left front fenders 9 made of resin or metal at both sides of the bonnet 8, and a bumper 10 in front of the bonnet 8. Each of the front fenders 9 is molded integrally with the bonnet 8, for covering the upper and rear portions of each of the front wheels 1, and is formed into a substantially inverted L shape in side view.

An upper portion of the cabin 5 is surrounded by a protective frame 3 made of a metallic pipe. The protective frame 3 is constituted of a pair of right and left side frame members 3a, a pair of front and rear upper connecting members 3b for connecting the upper ends of the right and left side frame members 3a to each other, and rear connecting members 3c for connecting the respective rear portions of the right and left side frame members 3a to each other in an X-shaped manner. The upper rear connecting members 3c is provided with a pair of right and left head rests 14. A front upper portion of the right side frame member 3a is provided with a grip 19 to be griped by an assistant rider.

Inside of the cabin 5, a driver's seat 15 is installed on the left side while a assistant driver's seat 16 is installed on the right side, a dash board (an operational unit) 17 is arranged at the front portion, and a steering wheel 18 is provided on left side of the dash board 17. An engine room 21 is formed under the seats 15 and 16, and right and left sides of the engine room 21 are covered with side covers 22, respectively. Moreover, U-shaped guards 20 for guarding the passengers are provided onto a left side of the driver's seat 15 and onto a right side of the assistant driver's seat 16, respectively.

Figure 2:
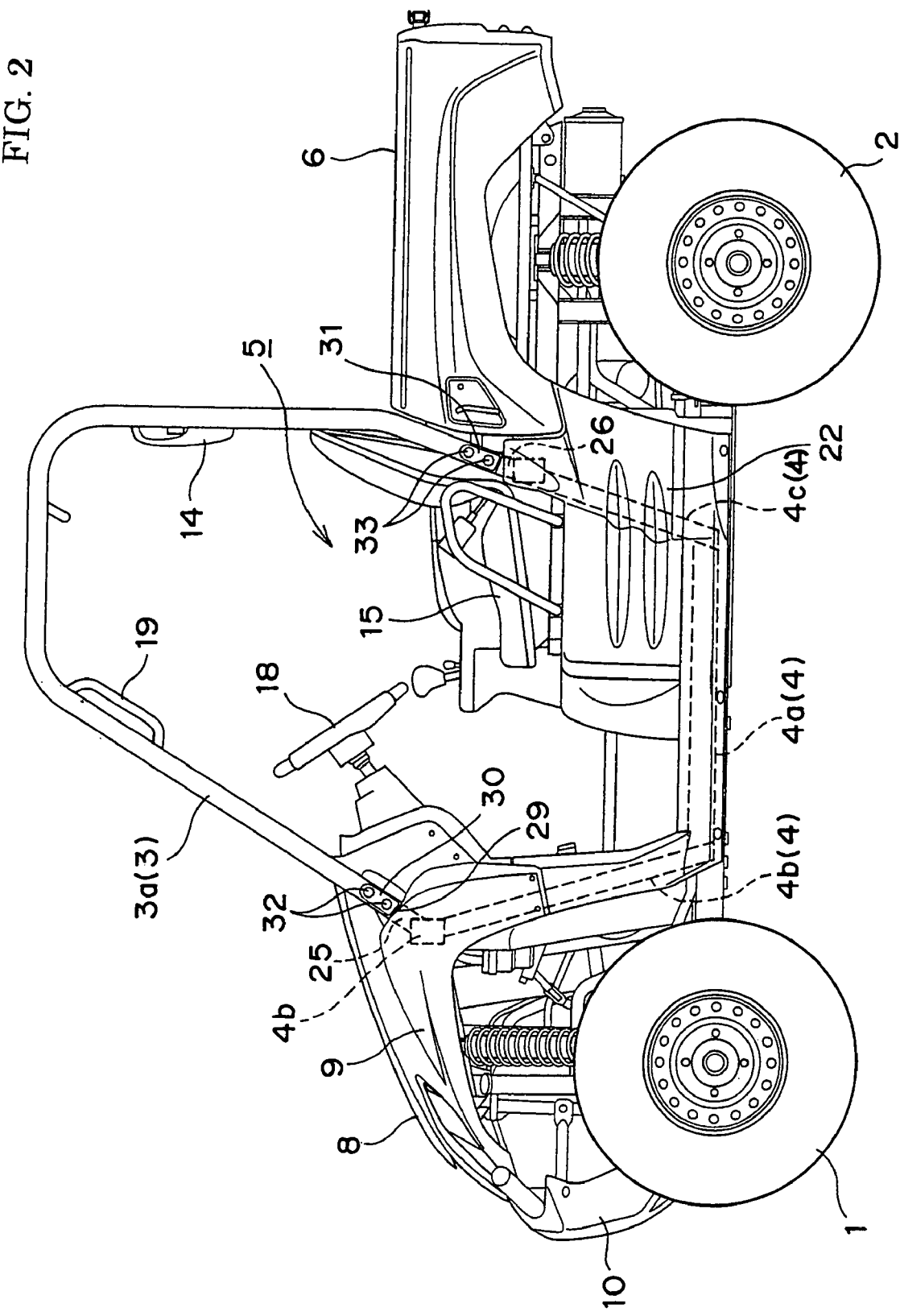
FIG. 2 is a left side view showing the four wheeled utility vehicle of FIG. 1.

FIG. 2 is a left side view showing the four wheeled utility vehicle of FIG. 1. The cabin frame 4 is constituted of a lower cabin frame 4a located substantially horizontally at a lower end of the cabin 5, a front cabin frame 4b which is raised upward from a fore end of the lower cabin frame 4a in a forward inclined manner, and then, extends upward behind the front wheel 1, and a rear cabin frame 4c which is raised upward from a rear end of the lower cabin frame 4a in a rearward inclined manner, and then, extends upward toward a back side of the seat 15 and 16.

The lower cabin frame 4a is formed into a substantially rectangular shape in a plan view.

The front cabin frame 4b includes a pair of right and left vertical frame members, which are raised upward from the right and left fore ends of the lower cabin frame 4a, and a lateral frame member for connecting the upper ends of the pair of right and left vertical frame members to each other. The front cabin frame 4b is formed into a substantially rectangular shape in the front view. The right and left vertical frame members of the front cabin frame 4b are accommodated in the right and left front fenders 9, respectively. Right and left corners of the upper end of the front cabin frame 4b are positioned substantially in the vicinity of rear upper ends inside of the right and left front fenders 9, respectively.

The rear cabin frame 4c includes a pair of right and left vertical frame members, which are raised upward from the right and left rear ends of the lower cabin frame 4a, and a lateral frame member for connecting the upper ends of the pair of right and left vertical frame members to each other. The rear cabin frame 4c is formed into a substantially rectangular shape in a rear view. The right and left vertical frame members of the rear cabin frame 4c are covered with the side covers 22, respectively.

Right and left front fixing members 25 for fixing front end portions of the protective frame 3 are provided onto right and left corners at the upper end of the front cabin frame 4b, respectively. Each of the front fixing members 25 extends upward in a rearward inclined manner, and then, projects upward from the front fender 9 through the rear upper end portion of the front fender 9.

Right and left rear fixing members 26 for fixing rear end portions of the protective frame 3 are provided on the right and left corners at the upper end of the rear cabin frame 4c, respectively. Each of the rear fixing members 26 extends upward in a rearward inclined manner, and then, projects upward from an upper end of the side cover 22.

The side frame member 3a of the protective frame 3 is formed into a substantially trapezoidal shape in a side view. The side frame member 3a extends upward from the front fixing member 25 in a rearward inclined manner, and further, extends substantially horizontally rearward at the upper portion of the cabin 5. Moreover, the side frame member 3a extends substantially vertically downward from the rear upper portion of the cabin 5 to the rear fixing member 26.

Figure 3:
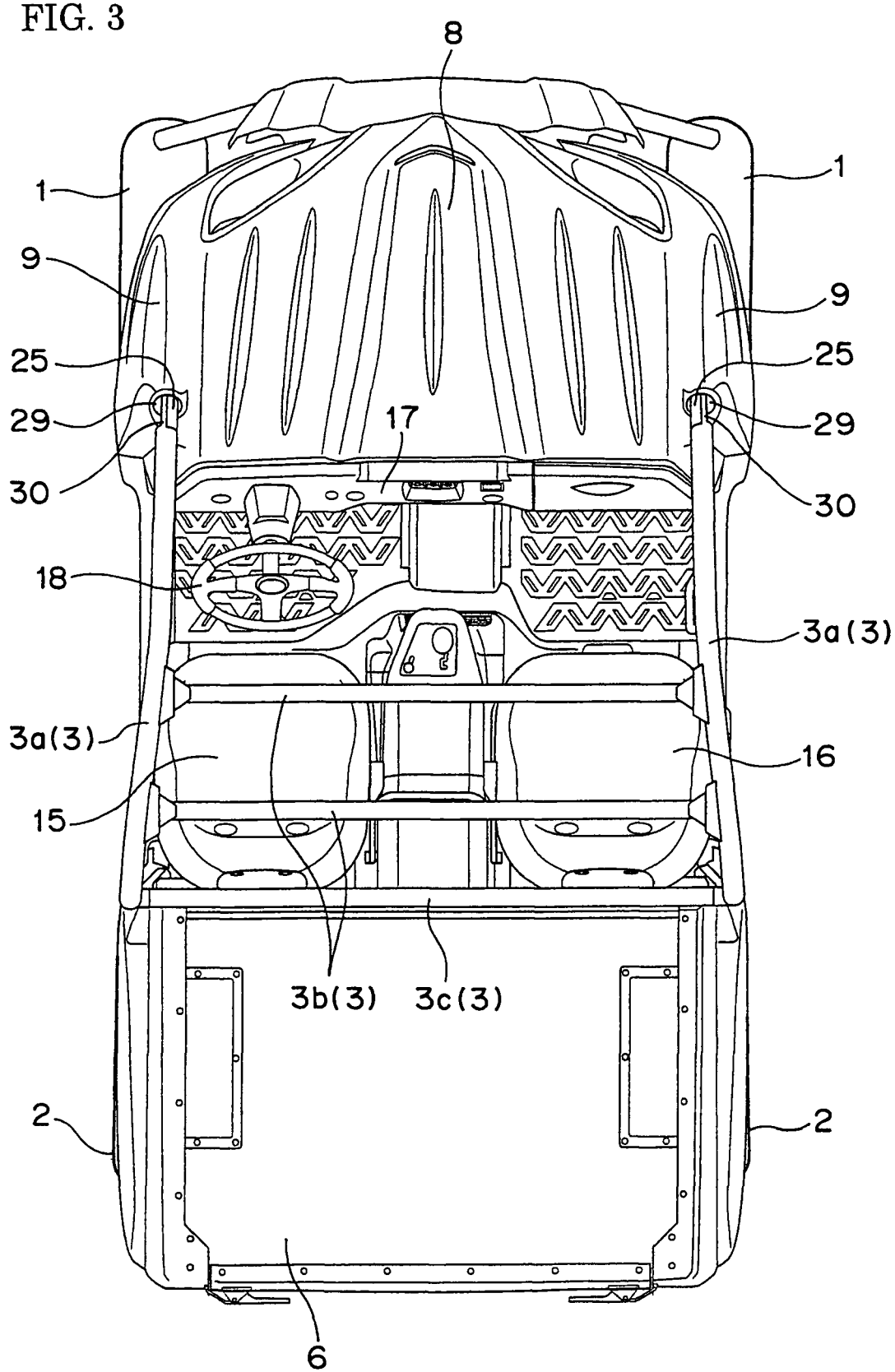
FIG. 3 is a plan view showing the four wheeled utility vehicle of FIG. 1.

FIG. 3 is a plan view showing the four wheeled utility vehicle of FIG. 1. Circular through holes 29 are formed in the rear upper ends of the right and left front fenders 9, respectively. The front fixing members 25 project upward from the front fender 9 through the through holes 29.

Figure 4:
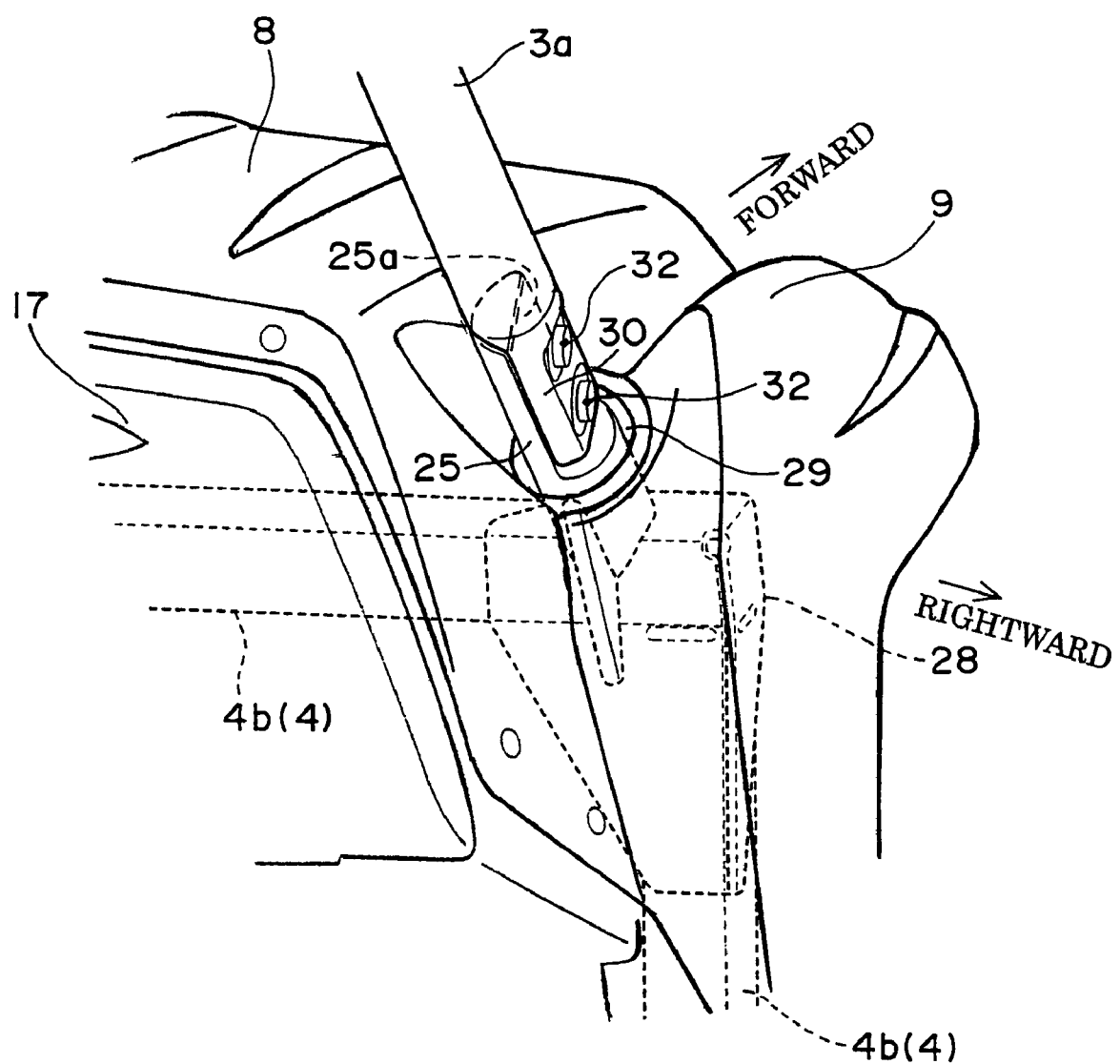
FIG. 4 is an enlarged perspective view showing a fixing structure at a fore lower end of a protective frame in the four wheeled utility vehicle of FIG. 1.

FIG. 4 is an enlarged perspective view showing a fixing portion at a fore lower end 30 of the right side frame member 3a, as viewed from back above. In FIG. 4, right corner fitting 28 is securely welled to the right corner of the upper end of the front cabin frame 4b. Moreover, the right front fixing member 25 is securely welded to the corner fitting 28.

The right front fixing member 25 projecting upward from the through hole 29 is formed into a semi-split columnar shape by cutting off a right half in a flat manner, thereby forming a flat fixing surface 25a oriented outward (i.e., rightward) in a vehicle width direction. In the meantime, the fore lower end 30 of the right side frame member 3a is formed into a thick plate by cutting off a left half and cutting off a right end in a flat manner.

The fore lower end 30 formed into the thick plate in the right side frame member 3a overlaps the flat fixing surface 25a of the right front fixing member 25 from the outside (i.e., from the right) in the vehicle width direction, and then, a pair of upper and lower bolts 32 are inserted into the fore lower end 30 of the side frame member 3a from the outside i.e., from the right) in the vehicle width direction, to be thus screwed to the front fixing member 25, so that the fore lower end 30 of the right side frame member 3a is tightened to the right front fixing portion 25.

Figure 5:
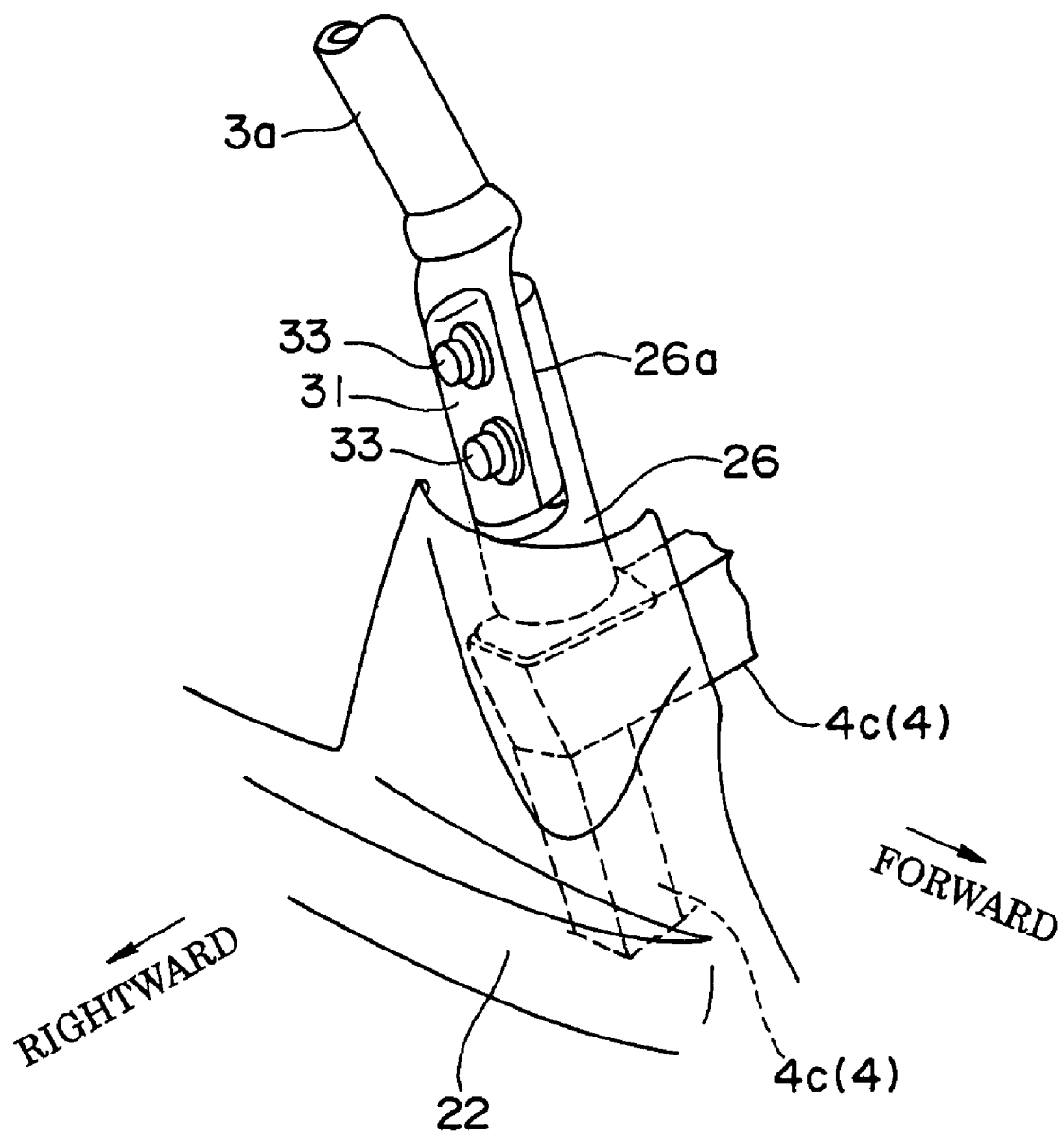
FIG. 5 is an enlarged perspective view showing a fixing structure at a rear lower end of a protective frame in the four wheeled utility vehicle of FIG. 1.

FIG. 5 is an enlarged perspective view showing a fixing portion at a rear lower end 31 of the right side frame member 3a, as viewed from front above. In FIG. 5, the right rear fixing member 26 fixed rigidly to the cabin frame 4 and projecting upward from the upper end of the side cover 22 is formed into a semi-split columnar shape by cutting off a right half, thereby forming a flat fixing surface 26a oriented outward (i.e., rightward) in the vehicle width direction. In the meantime, the rear lower end 31 of the right side frame member 3a is formed into a substantially thick plate by cutting off a left half and cutting off a right end in a flat manner.

The rear lower end 31 formed into the thick plate in the right side frame member 3a overlaps the flat fixing surface 26a of the right rear fixing member 26 from the outside (i.e., from the right) in the vehicle width direction, and then, a pair of upper and lower bolts 33 are inserted into the rear lower end 31 of the side frame member 3a from the outside (i.e., from the right) in the vehicle width direction, to be thus screwed to the rear fixing portion 26, so that the rear lower end 31 of the right side frame member 3a is tightened to the right rear fixing portion 26.

In addition, in FIG. 3, the fixing structure for the fore lower end 30 and the rear lower end 31 of the left side frame member 3a is laterally symmetric to the fixing structure in the above-described right side frame member 3a. Therefore, a detailed description will not be given here.

Several advantages of the present invention over the prior art are hereinafter described. When the four wheeled utility vehicle is transported on a truck or a ship, the protective frame 3 is detached from the four wheeled vehicle. As a consequence, it is possible to reduce a carrying space and a transportation fee, and facilitate a loading and unloading work.

Since the front fixing portion 25 projects upward from the front fender 9 and the rear fixing portion 26 projects upward from the upper end of the side cover 22, the protective frame 3 can be readily attached to or detached from the four wheeled vehicle without any interfere by the front fender 9 and the side cover 22.

The fore lower end 30 and the rear lower end 31 of the protective frame 3 are fixed to the front fixing member 25 and the rear fixing member 26 fixed rigidly to the cabin frame 4, thus maintaining the high fixing rigidity of the protective frame 3.

The respective fixing surfaces 25a and 26a of the front fixing member 25 and the rear fixing member 26 are formed outward in the vehicle width direction, and further, the fore lower end 30 and the rear lower end 31 of the protective frame 3 overlap the fixing surfaces 25a and 26a from the outside in the vehicle width direction, respectively. Thus, it is possible to enhance the strength of the protective frame 3 against the load in the vehicle width direction. Additionally, the fore lower end 30 and the rear lower end 31 of the protective frame 3 are tightened via the bolts 32 and 33 inserted from the outside in the vehicle width direction, respectively, thereby facilitating the fixing work of the protective frame 3 from the outside in the vehicle width direction.

Since the front fender 9 is only provided with the through hole 29 into which the front fixing member 25 is inserted for fixing the protective frame 3 to the cabin frame 4, a die molding work of the front fender 9 is not complex. In addition, even if rainwater or the like flows downward along the protective frame 3, the rainwater flows out on the ground through the front fender 9, thereby making it unnecessary to interpose any seal device or the like between the through hole 29 and the front fixing member 25. In other words, the number of component parts cannot be increased due to the formation of the through hole 29.

The fixing surface 25a of the front fixing member 25 and the fixing surface 26a of the rear fixing member 26 need not always be formed outward in the vehicle width direction, and alternatively, they may be formed forward or rearward of the fixing members.

Although in the above-described preferred embodiment, the fore lower end 30 and the rear lower end 31 of the protective frame 3 are tightened via the bolts 32 and 33, the present invention is not limited to the above-described fixing structure. For example, the fore lower end 30 and the rear lower end 31 may be fitted to the front fixing member 25 and the rear fixing portion 26, respectively, and then, may be prevented from being slipped off by the effect of stopper pins.

The present invention is not limited to the above-described preferred embodiments, and therefore, encompasses various modifications within the scope without departing from the subject matter of claims.

What is claimed is:

1. A four wheeled utility vehicle comprising:
a pair of front wheels including a right front wheel and a left front wheel;
a pair of rear wheels including a right rear wheel and a left rear wheel;
a cabin arranged between the pair of front wheels and the pair of rear wheels, the cabin being defined by a cabin frame and accommodating an operational unit for the four wheeled utility vehicle and seats for passengers of the four wheeled utility vehicle;
a front fender covering a front portion of the cabin frame and one of the right front wheel and the left front wheel, the front fender including a through hole formed in an upper part of the front fender;
a protective frame extending from a front portion of the cabin to a rear portion of the cabin; and
a front fixing member fixed rigidly to the front portion of the cabin frame, the front fixing member extending upward and projecting through the through hole formed in the upper part of the front fender;
wherein a fore lower end of the protective frame is detachably and attachably fixed to the front fixing member at an upper end portion of the front fixing member.

2. The four wheeled utility vehicle as claimed in claim 1, wherein the front fixing member has a fixing surface facing outward in a direction of a width of the four wheeled utility vehicle, and
the fore lower end of the protective frame is fixed to the fixing surface from an outside of the cabin in the direction of the width of the four wheeled utility vehicle.

3. The four wheeled utility vehicle as claimed in claim 2, wherein the fore lower end of the protective frame is tightened to the fixing surface of the front fixing member with bolts inserted from the outside of the cabin in the direction of the width of the four wheeled utility vehicle.

4. The four wheeled utility vehicle as claimed in claim 1, further comprising:
a side cover for covering a side of a rear portion of the cabin frame;

a rear fixing member fixed rigidly to the rear portion of the cabin frame, the rear fixing member extending upward and projecting from an upper end of the side cover;

wherein a rear lower end of the protective frame is fixed to the rear fixing member at an upper end portion of the rear fixing member.

5. The four wheeled utility vehicle as claimed in claim 4, wherein the rear fixing member has a fixing surface facing outward in a direction of a width of the four wheeled utility vehicle;

the rear lower end of the protective frame is fixed to the fixing surface from an outside of the cabin in the direction of the width of the four wheeled utility vehicle.

6. The four wheeled utility vehicle according to claim 5, wherein the rear lower end of the protective frame is tightened to the fixing surface of the rear fixing member with bolts inserted from the outside of the cabin in the direction of the width of the four wheeled utility vehicle.

7. The four wheeled utility vehicle according to claim 1, wherein the through hole is circular, the upper end portion of the front fixing member includes a columnar portion and a distal end, the distal end of the upper end portion being formed in a split-columnar shape with a flat fixing surface facing outward in a direction of a width of the four wheeled utility vehicle, the flat fixing surface being provided for attaching the protective frame to the cabin frame.

8. The four wheeled utility vehicle according to claim 1, wherein the upper end portion of the front fixing member includes a columnar portion and a distal end, the columnar portion extending through the through hole, the distal end of the upper end portion having a semicircular cross section and a flat fixing surface facing outward in a direction of a width of the four wheeled utility vehicle, the flat fixing surface being provided for attaching the protective frame to the cabin frame.

9. The four wheeled utility vehicle according to claim 4, the upper end portion of the rear fixing member includes a columnar portion and a distal end, the columnar portion extending through the side cover, the distal end of the upper end portion having a semicircular cross section and a flat fixing surface facing outward in a direction of a width of the four wheeled utility vehicle, the flat fixing surface being provided for attaching the protective frame to the cabin frame.

10. A four wheeled utility vehicle comprising:

a pair of front wheels including a right front wheel and a left front wheel;

a pair of rear wheels including a right rear wheel and a left rear wheel;

a cabin frame extending along a bottom portion of the four wheeled utility vehicle between the pair of front wheels and the pair of rear wheels, a cabin arranged between the pair of front wheels and the pair of rear wheels, the cabin accommodating an operational unit for the four wheeled utility vehicle and seats for passengers of the four wheeled utility vehicle;

a front fender covering a front portion of the cabin frame and one of the right front wheel and the left front wheel, the front fender including a through hole formed in an upper part of the front fender;

a protective frame extending from a front portion of the cabin to a rear portion of the cabin; and a front fixing member rigidly attached to the front portion of the cabin frame, the front fixing member extending upward and projecting through the through hole;

a side cover covering a side of a rear portion of the cabin frame; and a rear fixing member rigidly attached to the rear portion of the cabin frame, the rear fixing member extending upward and projecting from an upper end of the side cover;

wherein a fore lower end of the protective frame is detachably and attachably fixed to the front fixing member at an upper end portion of the front fixing member, and a rear lower end of the protective frame is detachably and attachably fixed to the rear fixing member at an upper end portion of the rear fixing member.

11. The four wheeled utility vehicle of claim 10, wherein each of the front fixing member and the rear fixing member includes a columnar portion and a distal end, the distal end having a flat fixing surface facing outward in a direction of a width of the four wheeled utility vehicle, the columnar portion of the front fixing member extending through the through hole and the columnar portion of the rear fixing member extending through the side cover, the flat fixing surface being provided for attaching the protective frame to the cabin frame.

12. The four wheeled utility vehicle of claim 11, wherein each of the fore lower end and the rear lower end of the protective frame include a flat contact surface which contact and attach to the flat fixing surface of the front fixing member and the rear fixing member, respectively.

* * * * *